United States Patent
Mercier

[11] Patent Number: 5,897,765
[45] Date of Patent: Apr. 27, 1999

[54] ELECTROCHEMICAL TREATMENT METHOD AND DEVICE FOR SOFTENING WATER

[76] Inventor: Dominique Mercier, 29, rue Georges Buire, 59552 Courchelettes, France

[21] Appl. No.: 08/913,058

[22] PCT Filed: Mar. 8, 1996

[86] PCT No.: PCT/FR96/00369

§ 371 Date: Sep. 5, 1997

§ 102(e) Date: Sep. 5, 1997

[87] PCT Pub. No.: WO96/28389

PCT Pub. Date: Sep. 19, 1996

[30] Foreign Application Priority Data

Mar. 10, 1995 [FR] France ................................ 95.02819

[51] Int. Cl.⁶ .................................................. C02F 1/461
[52] U.S. Cl. ......................... 205/743; 205/759; 205/755; 204/228; 204/275; 204/290 R
[58] Field of Search ................................ 205/743, 759, 205/755; 204/228, 275, 290 R

[56] References Cited

U.S. PATENT DOCUMENTS 4,173,525  11/1979  Nakamatsu et al. ................... 204/275
4,772,369  9/1988  Mercier .................................. 204/231

FOREIGN PATENT DOCUMENTS

WO 87/01108  2/1987  WIPO.

Primary Examiner—Arun S. Phasge
Attorney, Agent, or Firm—Young & Thompson

[57] ABSTRACT

A method and a device for electrochemically treating water to reduce its degree of hardness, wherein the water to be treated is electrolyzed between an anode (5) and a cathode (7, 7') connected to the positive (B) and negative (A) terminals respectively of a current generator (1), each consisting of at least one electrode. A thin porous coating at least partially consisting of calcium carbonate is formed at the cathode (7) and a gas flow is generated through the pores of the cathode (7) as the water is electrolyzed so that the crystals at least partially made up of calcium carbonate and formed on the coating during electrolysis are detached therefrom by the gas flow.

18 Claims, 2 Drawing Sheets

ELECTROCHEMICAL TREATMENT METHOD AND DEVICE FOR SOFTENING WATER

CROSS REFERENCE TO RELATED APPLICATION

This application is the 35 USC §371 National phase of International application PCT/FR96/00369 filed on Mar. 8, 1996, which designated the United States of America.

FIELD OF THE INVENTION

The present invention relates to a method for electrochemically treating water with a view to softening it, as well as to a device for carrying out this method.

BACKGROUND OF THE INVENTION

Among the various treatments of water with a view to softening it, different methods and apparatus are known, employing a bipermutation of ions on ion exchanger polymers. Treatments are also known, in which there are added to the water to be treated chemical reagents such as lime or soda. In both cases, these techniques employ outside chemical reagents. The use of the latter involves, on the one hand, a substantial modification of the quality of the water and, on the other hand, a regular maintenance and supply of consumable products generating high exploitation costs.

Furthermore, different water treatment techniques exist which employ magnetic fields or electric fields. These different known methods have a "delaying" action on the phenomena of scale deposit, provoking the germination of the calcium carbonate within the water and/or intervening on the speed of growth of these germs. The drawback of these water treatment techniques is that they do not provoke crystallization and immediate precipitation of the calcium carbonate contained in the water to be treated.

SUMMARY OF THE INVENTION

The present invention aims at overcoming these drawbacks by proposing a method and apparatus making it possible, under particularly economical and reliable conditions, to obtain a total or partial controlled softening of the water.

The present invention thus has for its object a method for electrochemically treating water to reduce its degree of hardness, in which the water to be treated is electrolyzed between an anode and a cathode connected to the positive and negative terminals respectively of a current generator, each consisting of at least one electrode, characterized in that it comprises the steps consisting in constituting at the cathode a thin porous coating at least partially formed by calcium carbonate, simultaneously electrolyzing the water and generating a gas flow through the pores of the cathode, so that the crystals at least partially made up of calcium carbonate and formed on said coating during electrolysis are detached therefrom by the gas flow.

In an embodiment of the invention, the degree of hardness of the treated water may be controlled, particularly in automatized manner, by measuring the value of a given parameter of said water and modifying the value of the intensity of the electric current which traverses the liquid to be treated as a function of the value of said parameter.

The present invention also has for an object a device for electrochemically treating water with a view to reducing its degree of hardness, constituted by an electrolytic cell comprising an anode and a cathode respectively connected to the positive and negative terminals of a current generator, each constituted by at least one electrode, characterized in that the cathode comprises a coating constituted, at least in part, by adhesive and porous calcium carbonate, and means for propelling a gas flow through the pores of this cathode, so as to detach and cause to precipitate the deposits which are formed on said coating, particularly the calcium carbonate deposits.

In an embodiment of the invention, the cathode is constituted by a porous metal, particularly a sintered metal, coated with a thin, porous layer of calcium carbonate.

The jet of gas may be constituted by hydrogen, this latter being obtained in particular by bringing the potential of the cathode to a sufficient given value.

In an embodiment of the device according to the invention, said device comprises means adapted to measure the value of a given parameter of the treated water and means for modifying the value of the intensity of the electric current which traverses the electrolytic cell as a function of the value of said parameter.

BRIEF DESCRIPTION OF THE DRAWINGS

Various forms of embodiment of the present invention will be described hereinafter by way of non-limiting example, with reference to the accompanying drawings, in which.

DETAILED DESCRIPTION OF THE INVENTION

Figure 1:
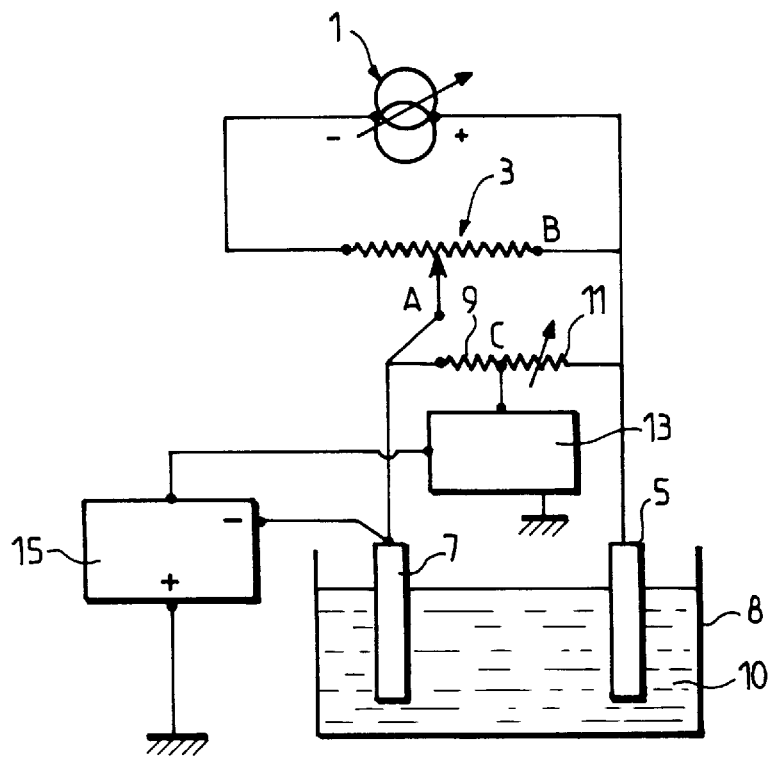
FIG. 1 is an electric diagram of a water treatment device according to the invention.

The device according to the invention shown in FIG. 1 is essentially constituted by a current generator 1 which supplies a power potentiometer 3 which delivers between its terminals A and B a current of adjustable intensity when they are respectively connected to an anode 5 and a cathode 7 of an electrolytic tank 8 containing water 10 of which it is desired to reduce the hardness. Terminals A and B of the potentiometer 3 are connected to the two ends of a divider bridge constituted by two resistors, namely a fixed resistor 9 and an adjustable resistor 11 of which a centre point C enables an adjustable reference voltage to be taken which is supplied to an electronic voltage comparator 13. The latter is connected to an adjustable voltage generator 15 whose positive terminal is connected to earth and negative terminal is connected to the cathode 7, so that it makes it possible to apply thereto an adjustable negative voltage.

Figure 2:
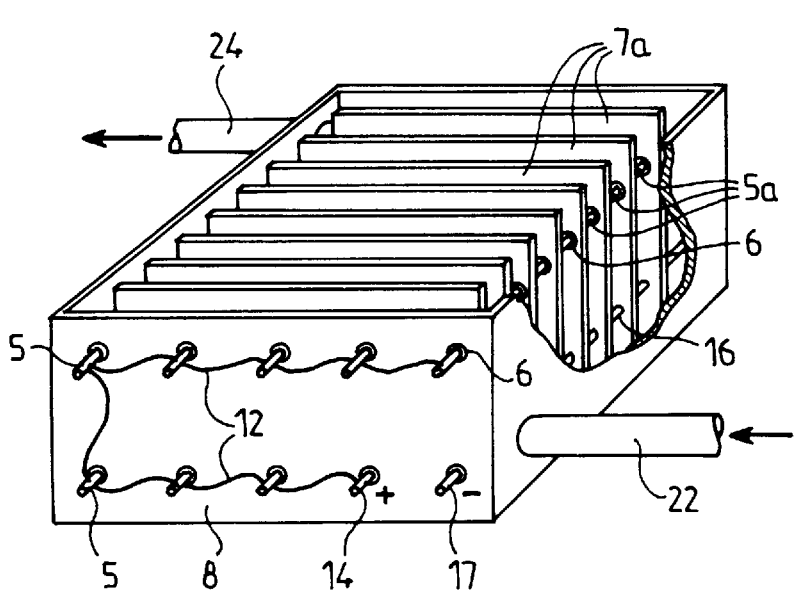
FIG. 2 is a drawing in perspective of a water treatment device according to the invention.

As shown in FIG. 2, the electrolytic tank 8 is for example constituted by a vat of insulating material of parallelepipedic shape, which comprises at its base a pipe 22 for admission of water to be treated and in its upper part a pipe 24 for evacuation of the treated water. The cathode 7 is constituted by eight plates 7a of stainless steel, preferably of food-compatible type such as the one referenced 316L, which are maintained in spaced apart relationship parallel to one another by nine bars 5a, with the interposition of insulating rings 6, so that these bars constitute the anodes 5. The nine bars 5a are joined together and to an anode terminal 14 by a conductor 12 and the eight plates 7a are joined together and to a cathode terminal 17 by a bar 16. The surface of the plates 7a forming the cathode 7 is polished with care, either mechanically or preferably by an electrolytic polishing. The ratio of the total surface S of the plates 7a forming the cathode 7 with respect to the total surface S' of the bars 5a forming the anode 5 is of the order of 10 to 20, so that, at the anode, the surface density of the current is from 10 to 20 times greater than what it is at cathode 7. The cathode plates 7a are spaced apart from one another by about 2 cm. The material constituting the anode 5 is such that the reaction of oxidation of the water is produced without excessive over-voltage. Furthermore, this material must be stable over very long periods. Titanium, and preferably titanium coated with platinum, iridium or ruthenium, will thus preferably be used.

Under these conditions, the present device operates in the manner described hereinafter.

In a first step of the method according to the invention, there is formed on the plates 7a constituting the cathode 7, a fine, porous, so-called primary layer of calcium carbonate. To that end, a first electrolysis of the water is effected, in which the voltage generator 15 is adjusted so that it applies to the cathode 7 a negative voltage, such that the only electrochemical reaction at the cathode is the reduction of the dissolved oxygen, so that a fine, adherent layer of calcium carbonate is then deposited on the cathode in accordance with the reaction:

$$4Ca^{++} + 4HCO_3^- + O_2 + 4e^- \rightarrow 4CaCO_3 + 2H_2O$$

As the layer of calcium carbonate is formed on the cathode 7, the resistance of the electrolytic cell increases progressively so that the intensity of the electrolysis current decreases, as well as the difference in potential at the terminals A and C of the voltage comparator 13, to attain a predetermined threshold value which was previously fixed by means of the adjustable resistor 11 of the divider bridge. This value is preferably such that it corresponds to a drop in the intensity of the current in the electrolytic cell by 20%. The comparator 13 then controls the voltage generator 15 which applies to the cathode 7 a negative voltage with respect to the earth, which is fixed at a determined value, to provoke at the cathode the reduction of the water, which is translated by a release of hydrogen in accordance with the well-known reaction:

$$2H_2O + 2e^- \rightarrow H_2 + 2OH^-$$

Such release of hydrogen acts on the fine primary layer of calcium carbonate made on the cathode 7 to create pores therein. Consequently, the cathode 7 is ready for the following step during which the degree of hardness of the water contained in the electrolytic cell 8 is reduced.

To that end, an electric current is passed in the cell 8 and a higher negative potential is applied, by means of the voltage generator 15, to the cathode 7 in order to provoke a reduction of the water so as to produce a release of hydrogen.

Under these conditions, it is ascertained that the porous layer of calcium carbonate performs the role of centre of nucleation and generates thereon the formation of germs which serve as support for the production of crystals of calcium carbonate during electrolysis, these crystals being torn from the cathode by the stream of hydrogen, so that they then precipitate in the liquid 10 and drop to the bottom of the tank 8, where it suffices to recover them. The calcium carbonate crystals being torn from the cathode 7 as they are formed, the thickness of the primary layer of calcium carbonate remains constant in the course of time and electrolysis may be extended for as long as necessary.

Furthermore, according to the invention, insofar as the density of the anodic current is great, dissolved oxygen is produced in accordance with the reaction:

$$2H_2O - 4e^- \rightarrow O_2 + 4H^+$$

which drives the carbon dioxide from the treated water and which escapes in the atmosphere.

Moreover, the concentration of dissolved oxygen increases, which promotes the cathodic reaction, since there is addition of the reduction of the dissolved oxygen and of the reduction of the water, which reactions both produce hydroxide ions $OH^-$.

The method according to the invention may of course be carried out by previously producing cathodes precoated with the primary coating of porous calcium carbonate necessary for carrying out the second step of the method, in the laboratory or in the factory.

The yield of decarbonation may also be substantially improved in accordance with the invention by forming around the cathode a gel constituted by strongly hydrated calcium carbonate.

To that end, a sufficient negative potential for the surface density of current at the cathode to be greater than 2 A/m² is applied to the cathode. In accordance with the present invention, the surface density of the current at the cathode will preferably be included between 2 A/m² and 8 A/m².

It has been ascertained that, under these conditions, a gel was formed at the cathode which opposed only very weakly the thrust of the hydrogen which originates at this electrode.

This gel performs two essential functions. Firstly, it behaves substantially like a membrane which exerts a delaying effect with regard to the displacement of the $OH^-$ ions in the solution. The gel also has for an effect to behave like a brake to the migration of the $H^+$ ions towards the cathode, which reduces the combination of the $OH^-$ ions with the $H^+$ ions, which combination constitutes a reduction of the yield of decarbonation.

Furthermore, the gel, which is constituted in particular by amorphous monocrystals, attracts the $Ca^{++}$ ions as well as the carbonate and bicarbonate ions. It is ascertained that the $OH^-$ ions do not react directly with the bicarbonate ions but with the $H^+$ ions released by backscatter, which improves the yield of decarbonation, as, to each neutralization of the $H^+$ and $OH^-$ in the gel there corresponds the insertion of a $Ca^{++}$ and a $CO_3^{--}$ on a crystal of the gel.

Figure 3:
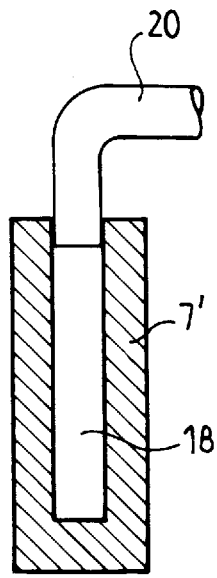
FIG. 3 is a view in longitudinal section of a variant embodiment of a cathode according to the invention.

In order to implement the present invention, gases other than hydrogen may be employed. To that end, porous cathodes may be employed, particularly cathodes constituted by a sintered metal. These cathodes are in a first step coated with a porous calcium carbonate layer. As shown in FIG. 3, they are constituted by a sintered metal cylinder 7' comprising a central, longitudinal cavity 18 which is in communication, via a conduit 20, with means for supplying pressurized gas. The gas is released through the cathode 7', so that it entrains the calcium carbonate crystals formed thereon in the course of electrolysis.

Of course, in such an embodiment, the voltage generator 15 is no longer used, insofar as it is no longer necessary to provoke at the cathode a reduction of the water with a view to obtaining a release of hydrogen.

The method according to the invention generating carbon dioxide at the anode, the treated water acidifies gradually as treatment continues. The reduction of the pH thus makes it possible to control, as set forth hereinafter, the process of decarbonation of the water.

The decarbonated water thus produced, insofar as it is not desired to use its aggressive character (as set forth hereinafter) with respect to the $CaCO_3$, must therefore undergo a treatment intended to eliminate the carbon dioxide. To that end, known methods of mixing, eddy, trikling, etc . . . may be used.

Figure 4:
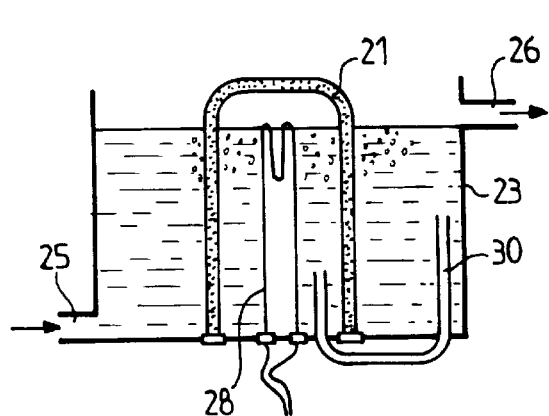
FIG. 4 is a diagram of an embodiment for constituting a cathode covered with a thin, porous coating of calcium carbonate.

In order to constitute the primary calcium carbonate coating on the cathode 7, a device as shown in FIG. 4 may be employed.

In this Figure, the device is constituted by a support of sintered metal, intended to constitute the cathode, having the shape of a bell 21. This bell 21 is immersed in a tank 23 supplied with carbonated water via a lower pipe 25. The tank 23 comprises an upper pipe 26 which acts as overflow. An electric resistor 28 is disposed inside the bell 21, and a pipe 30 communicates the interior thereof with the interior of the tank 23. To obtain on the surface of the porous bell 21 a porous deposit of calcium carbonate, operation is as follows:

The electric resistor 28 is supplied with electric current so as to take the water contained in the tank 23 to boiling point. In the course of this operation, a calcium carbonate deposit is formed on the walls of the bell 21, and in particular on the outer walls thereof. The bubbles of steam formed in the bell 21 traverse its sintered metal walls to be released to the outside, traversing the fine coating of calcium carbonate formed, which creates pores therein. When the thickness of the porous coating of calcium carbonate is sufficient, the process is interrupted and a cathode coated with a thin, porous layer of calcium carbonate is thus available. The pipe 30 makes it possible to remove water already treated, therefore partly deprived of its calcium carbonate, to produce the bubbles of steam, this minimizing the quantity of calcium carbonate formed inside the bell 21.

Of course, each anode and each cathode may be constituted by any number of elements.

When the layer of porous calcium carbonate is formed on a sintered metal, and more generally on a porous metal, this layer of calcium carbonate may be used as filtration membrane, whether it be in the case of it being produced by thermic effect or by electrolysis. The release of gas through the layer of calcium carbonate may easily be interrupted regularly in order to use the pores of this layer as passage for the water to be filtered. A simple system for avoiding blocking of the pores consists in alternating the operations of filtration and of release of gas.

The present invention makes it possible to control, particularly automatically, the level of decarbonation of the water. To that end, a physico-chemical parameter of the water is permanently measured during electrolysis and, as soon as this parameter attains a predetermined value representative of the state of decarbonation of the water, one intervenes on the process. In this way, the pH of the water may be measured and the electrolysis stopped as soon as it attains a given value. Intervention on the process of electrolysis may also be progressive, and, as the pH of the treated water decreases, the electrolysis current may be progressively reduced, cutting it totally when a given platform value is attained.

Figure 5:
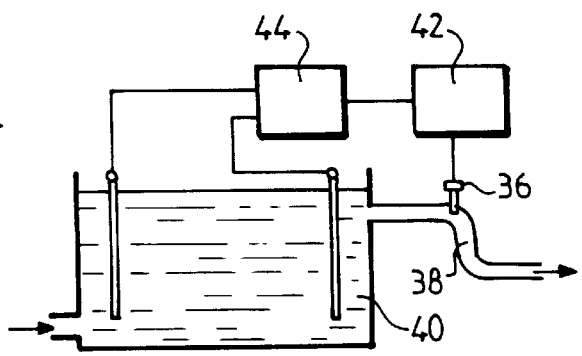
FIG. 5 is a schematic view of an embodiment of the invention.

FIG. 5 thus shows a device according to the invention comprising a sensor 36 which is disposed on a pipe 38 downstream of an electrolytic cell 40 and which is connected to an analysis unit 42. This latter compares the parameter measured by the sensor 36, particularly the pH, the conductivity, etc . . . with a reference value recorded in the analysis unit 42. The latter is in relation with an interface 44 adapted to intervene on the intensity of the current which traverses the electrolytic cell 40 in order to correct it as a function of the measure made by the sensor 36.

One of the parameters particularly appropriate for the control of the degree of hardness of the water is the pH, by reason, on the one hand, of its close correlation therewith and, on the other hand, of the easy measurement thereof.

Of course, the method and the device according to the invention make it possible, jointly with the crystallization of the calcium carbonate, to ensure precipitation of other salts, particularly salts of iron sodium, manganese, etc . . . , all these reactions being able to lead to a partial purification of the water or more exactly to a more complete demineralization thereof. The present invention is thus advantageous for treating brackish or ferriferous water.

In a variant embodiment, the present invention may also be carried out in a lamellar decanter device.

Figure 6:
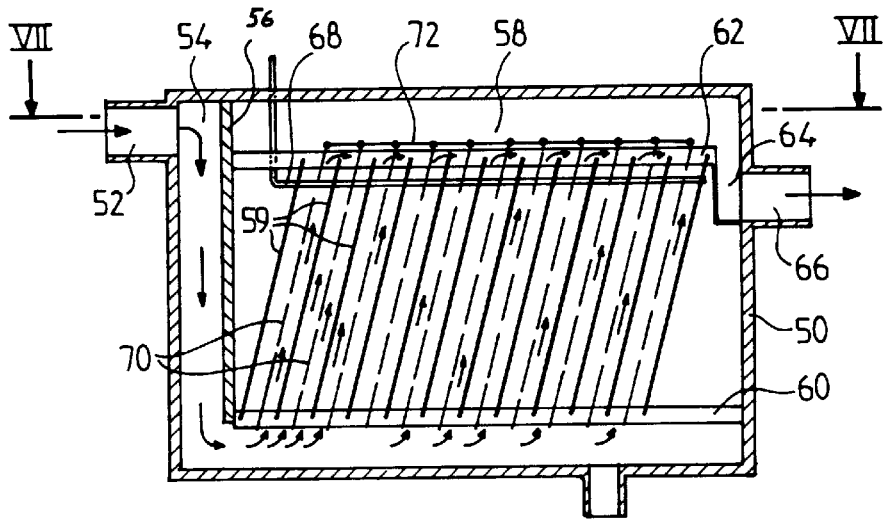
FIG. 6 is a view in section of a water treatment device according to the invention along line VI—VI of FIG. 7.
Figure 7:
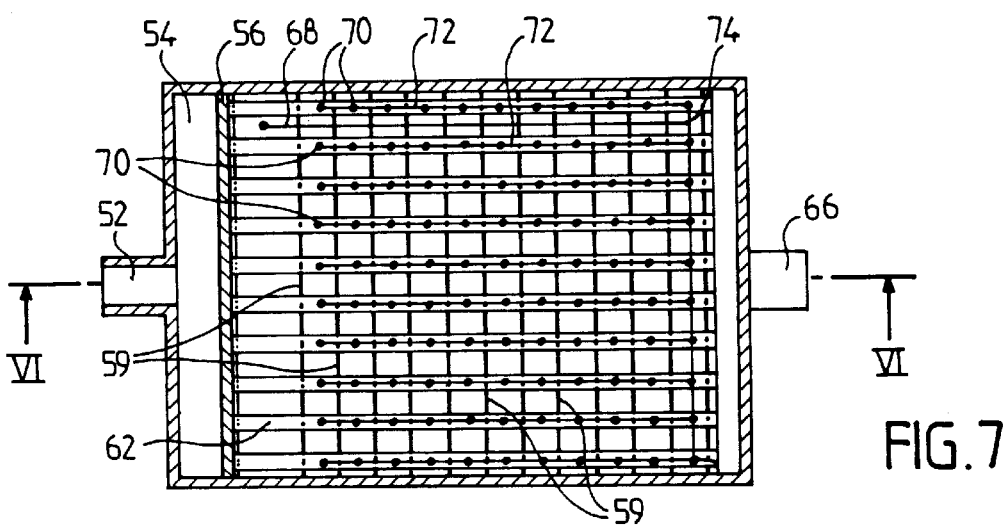
FIG. 7 is a view in section of the device shown in FIG. 6 along line VII—VII of the latter.

For example, a device of this type has been shown in FIGS. 6 and 7, constituted by a closed tank 50 comprising in its upper part a pipe 52 for admission of the water to be treated. The interior of the tank 50 is divided into two chambers, namely an inlet chamber 54 of small volume and a treatment chamber 58, by a transverse partition 56 which extends from the upper part of the tank 50 to such a distance from the bottom thereof as to allow a communication of the inlet chamber 54 with the treatment chamber 58. The interior of the treatment chamber 58 comprises a series of twelve transverse plates 59 inclined with respect to the vertical and which are maintained in their lower part by longitudinal elements 60 and in their upper part by longitudinal elements 62. The upper part of the inclined plates is in communication with an overflow device 64 connected to a pipe 66 for evacuating the treated water.

The plates 59 are constituted by a metal, and particularly stainless steel, and are joined together by a longitudinal rod 68 so that they constitute as many electrodes forming the cathode 7 of the device according to the invention. Metal wires 70 are stretched between each of the lower (60) and upper (62) elements, between the plates 59. All the wires 70 of the same longitudinal element are joined together by a longitudinal wire 72, the different longitudinal wires 72 being connected together by a transverse wire 74, so that the different wires 70 constitute as many electrodes forming the anode 5 of the device. The different wires 70 forming the anode 5 will preferably be constituted by titanium containing iridium.

Such a device is particularly advantageous in that it combines the normal effect of a decanter with that of the water treatment according to the invention. This device is also particularly efficient in that it combines a large electrode surface and a considerable volume of degassing.

In a particularly advantageous embodiment of the invention, the yield of decarbonation is increased by removing part of the hardness of the water to be treated by passing the latter through a fluidized bed constituted by crystals formed essentially by the calcium carbonate extracted from the water in the course of treatment. Such a passage may also be effected from the water already treated.

All the parts of the cathode may advantageously be produced with the aid of vitreous carbon or silver, which makes it possible to reduce the dissolved oxygen possibly in excess in the water during its passage in the treatment cell.

According to the invention, the demineralized water thus obtained may be used with a view to punctually or periodically removing scale from installations, particularly installations employing boilers. Timing systems may thus be used which allow the boiler to function normally during the day and which, at night, control bypass means for circulating the water previously treated in the pipes of the boiler and its accessories. In this way, scaling of the circuits of this boiler is considerably reduced by periodic dilution of the scale formed.

I claim:

1. In a method for electrochemically treating water to reduce its degree of hardness, wherein the water to be treated is electrolyzed between an anode and a cathode connected to the positive and negative terminals respectively of a current generator, each consisting of at least one electrode, the improvement which comprises the following steps:

constituting at the cathode a thin porous coating at least partially formed by calcium carbonate; and simultaneously electrolyzing the water and generating a gas flow thorough the pores of the cathode, so that crystals at least partially made up of calcium carbonate and formed on said coating during electrolysis are detached therefrom by the gas flow.

2. The method according to claim 1, wherein the gas flow is a flow of hydrogen.

3. The method according to claim 2, further comprising, in the course of implementing said method, taking the potential of the cathode to a sufficient given value to provoke, at said cathode, a release of hydrogen.

4. The method according to claim 3, wherein the potential of the cathode is such that the surface current density at the cathode ranges between 2 $A/m^2$ and 8 $A/m^2$.

5. The method according to claim 1, further comprising measuring the value of a given parameter of treated water, and modifying the value of the intensity of the electric current which traverses said treated water as a function of the value of said parameter.

6. The method according to claim 5, wherein said parameter is the pH.

7. The method according to claim 1, further comprising collecting the crystals constituted at least in part by calcium carbonate so as to form a bed, and passing the water to be treated and/or treated water through said bed.

8. Device for electrochemically treating water for reducing its degree of hardness, constituted by an electrolytic cell comprising an anode and a cathode respectively connected to the positive and negative terminals of a current generator, each constituted by at least one electrode, wherein the cathode comprises a coating constituted, at least in part, by adhesive and porous calcium carbonate, and means for propelling a gas flow through the pores of said cathode, so as to detach and cause precipitation of calcium carbonate deposits which are formed on said coating.

9. The device according to claim 8, wherein the ratio of the surface of the anode with respect to the surface of the cathode ranges between 20 and 50.

10. The device according to claim 8, wherein the cathode is constituted by a porous metal coated with a thin, porous layer of calcium carbonate.

11. The device according to claim 10, wherein the metal of the cathode is a sintered metal.

12. The device according to claim 8, wherein the cathode comprises a metal whose outer surface is polished.

13. The device according to claim 8, wherein the cathode is comprised, at least in part, by vitreous carbon or silver.

14. The device according to claim 8, further comprising means for propelling a gaseous flow of hydrogen from the cathode.

15. The device according to claim 8, further comprising electrical supply means adapted to take the potential of the cathode to a sufficient given value to provoke, at said cathode, a release of hydrogen.

16. The device according to claim 15, wherein said electric supply means are adapted to generate a surface current density at the cathode ranging between 2 $A/m^2$ and 8 $A/m^2$.

17. The device according to claim 8, further comprising means adapted to measure the value of a given parameter of treated water, and means adapted to modify the value of the intensity of the electric current which traverses the electrolytic cell as a function of the value of said parameter.

18. The device according to claim 8, wherein the anode is constituted by titanium coated with a material selected from the group consisting of platinum, iridium and ruthenium.

* * * * *